United States Patent [19]

Watson

[11] 4,163,578
[45] Aug. 7, 1979

[54] MAIN FRAME ASSEMBLY FOR ROAD VEHICLES

[75] Inventor: Norman F. Watson, Chipperfield, England

[73] Assignee: Stonefield Developments (Paisley) Limited, Paisley, Scotland

[21] Appl. No.: 788,999

[22] Filed: Apr. 19, 1977

[30] Foreign Application Priority Data

Apr. 20, 1976 [GB] United Kingdom ............... 15921/76

[51] Int. Cl.² .............................................. B62D 27/00
[52] U.S. Cl. ..................................... 296/204; 280/781
[58] Field of Search ................... 280/106 R; 296/28 J

[56] References Cited

U.S. PATENT DOCUMENTS

4,045,075  8/1977  Pulver ................................ 296/28 J

FOREIGN PATENT DOCUMENTS

| 275589 | 3/1928 | United Kingdom | 296/28 J |
| 462622 | 3/1937 | United Kingdom | 296/28 R |
| 786548 | 11/1957 | United Kingdom | 296/28 J |
| 1180058 | 2/1970 | United Kingdom | 296/28 J |
| 1349844 | 4/1974 | United Kingdom | 296/28 J |

*Primary Examiner*—Richard A. Bertsch
*Attorney, Agent, or Firm*—Charles E. Brown

[57] ABSTRACT

A main frame assembly for a road vehicle comprises two parallel vertical side frames connected together by cross members. The frame members are preferably composed of hollow tubes welded together. The cross members are unbraced to provide tortional flexibility without loss of load carrying capacity.

7 Claims, 9 Drawing Figures

MAIN FRAME ASSEMBLY FOR ROAD VEHICLES

This invention relates to main frame assemblies for road vehicles.

The main frame assembly of a conventional road vehicle is often in the form of a chassis, which is a planar frame composed of solid beams for example in the general form of a ladder. The longitudinal members of the chassis are usually manufactured as one-piece die-pressings and are assembled with cross members by riveting or bolting together a set of component parts. The assembly of a chassis from components requires a relatively large number of men and tools and is therefore a relatively expensive manufacturing process. Although die pressing can reduce the manufacturing costs of one particular chassis design, a change in the design of the chassis usually necessitates the manufacture of a completely new die. The die-pressing process is therefore comparatively inflexible.

A further disadvantage of the use of a conventional chassis is that the load/weight ratio of the chassis is relatively low. That is to say, where the vehicle is to be used for carrying heavy loads, the required chassis itself must be a comparatively massive structure. This has not only resulted in high manufacturing costs for heavy duty vehicles, but has also limited the possibility of manufacturing a multi-purpose road vehicle which can be used, if desired, to carry heavy loads, but which can also be used economically for transporting light or bulky loads or personnel.

Broadly in accordance with this invention we provide a main frame assembly for a road vehicle in which the conventional horizontal planar chassis frame is replaced by two parallel vertical side frames connected together by cross members.

The vertically disposed side frames are capable of bearing a much greater load than a planar frame of equivalent weight. Consequently the load carrying capacity of a vehicle incorporating the frame assembly of the invention is considerably improved.

The overall weight of the frame assembly can be further reduced by manufacturing the assembly from tubular metal. This material has the further advantages that it is readily available in a variety of sizes, it can be cut quickly and easily to any desired length, and can be joined securely by welding.

According to the present invention, therefore, we provide a main frame assembly for a road vehicle comprising two parallel spaced side frames each comprising a continuous upper beam and a plurality of lower beams, the upper beam of each side frame being connected to the lower beams of the side frame by connecting members which are not diagonally braced, the lower beams of the two side frames also being connected to each other along the length of the side frames by spaced cross members which are not diagonally braced, and the upper beams being connected together at their forward end only so as to define a generally U-shaped load space open at one end, one of the lower beams for each side frame being spaced inwardly from the others to define a wheel recess.

Preferably, the assembly is composed of tubes secured together by welding. The tubes may be of any suitable cross-section, but preferably are of square or rectangular cross-section.

The main frame assemblies of vehicles are subjected to considerable torsional stresses during use, for example whilst the vehicle is running over uneven ground. In order to ensure that the frame assembly is capable of enduring these stresses without suffering damage, the frame assembly must be designed to accommodate a controlled amount of torsional strain.

The conventional ladder-frame chassis construction is relatively flexible and, in many vehicles, relies upon the body of the vehicle itself to provide the desired degree of control over resistance to torsional forces. The resistance of such a chassis to torsion can be increased by incorporating additional cross-members in the chassis. However, a large number of relatively bulky and massive cross members must be included in the ladder frame in order to produce a large increase in the torsional resistance of the frame because the torsional forces acting on the ladder frame tend to exert forces on the cross members which are primarily torsional in nature, and the resistance of any cross member to torsion is comparatively low.

By contrast, when the frame assembly of the present invention is subjected to torsional stress, each side frame deforms in its own plane. The connecting members are therefore subjected primarily to S-bending forces rather than to torsional forces. Since the resistance of any beam to S-bending is normally greater than its resistance to bending under torsion, the desired resistance of the whole frame assembly to torsion can be achieved with a relatively light-weight construction.

It is because cross-bracing considerably increases rigidity that the connecting members of the side frames and the cross members connecting the side frames are unbraced. That is to say, each adjacent pair of connecting members and cross members together with the beams to which they are attached define a quadrilateral which is not braced by a diagonal member extending between opposite corners.

Each side frame will normally define the side walls of the vehicle with which the assembly is incorporated and will usually be shaped to accommodate the wheel arches of the vehicle, one or more recesses extending in the plane of the frame. In order to ensure that the wheel recesses do not reduce the load bearing capacity of the side frames, two of the cross members connecting the side frames are preferably attached immediately adjacent respective sides of the mouth of each recess and are also connected by tie bars to each other and to the side frames.

The frame assembly may be used in vehicles of any desired axle configuration, for example in vehicles having one front and one rear axle, one front and two rear axles, or one front axle and one rear bogie carrying two axles.

A preferred embodiment of the invention will now be described, by way of example only, with reference to the accompanying drawings, in which.

Referring to FIGS. 1 to 5 of the drawings, there is shown a vehicle main frame assembly 1 which is composed of steel tubes of rectangular cross section and which is assembled in a jig (not shown) by welding together the individual lengths of tubing.

Figure 1:
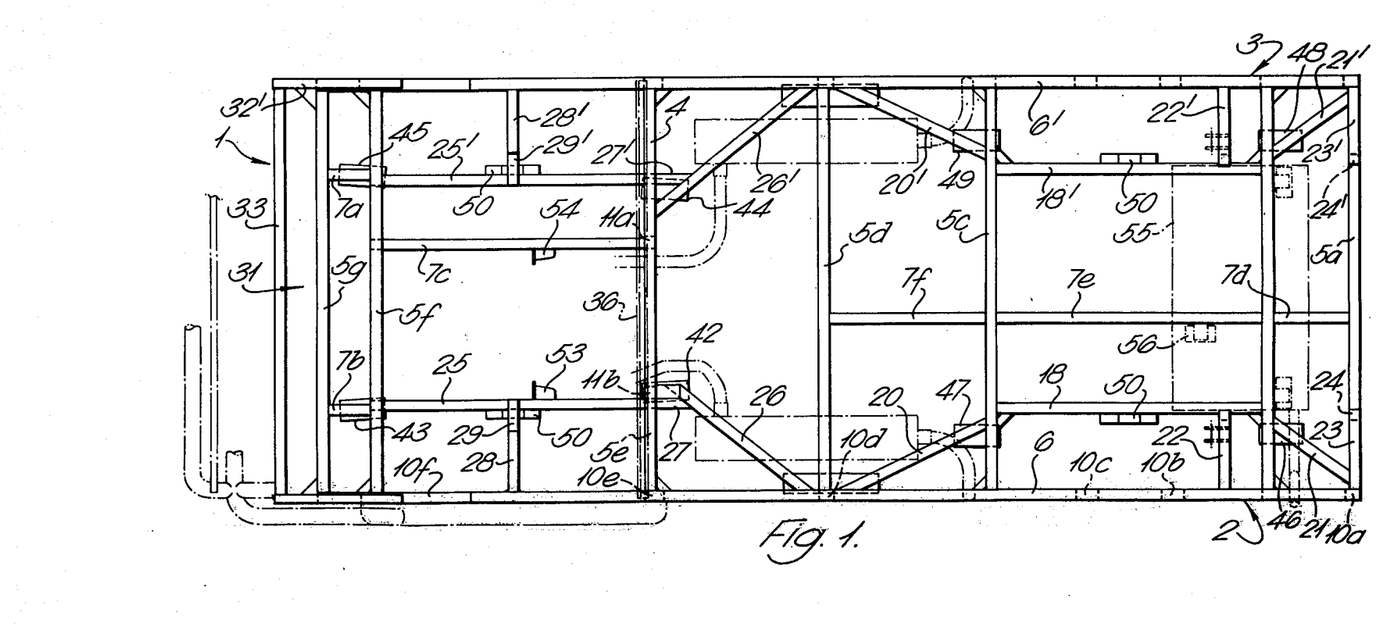
FIG. 1 is a plan of the main frame assembly indicating its position in a vehicle in relation to other components of the vehicle.
Figure 2:
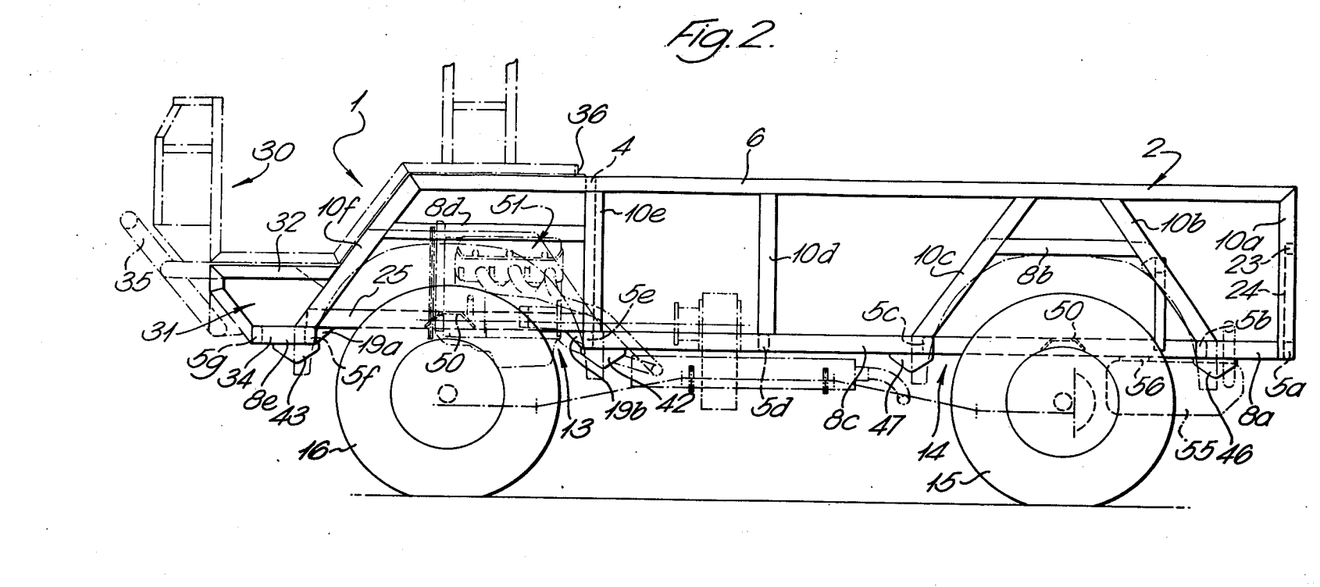
FIG. 2 is a side elevation of the main frame assembly of FIG. 1.

The frame assembly 1 comprises two spaced side frames 2, 3 disposed in parallel vertical planes and connected together by cross-members 4 and 5a, b, c, d, e, f, and g. The side frames 2, 3 are of identical construction and corresponding parts on one side frame 2 have been identified by similar primed reference numerals on the other side frame 3. For brevity, the construction of only one side frame will be described in detail.

As best seen in FIG. 2, the side frame 2 comprises an upper beam 6, extending longitudinally along the whole length of the upper edge of the side frame 2. The upper beam 6 is joined to five lower beams 8a, 18, 8c, 25 and 8e, which extend parallel to the upper beam 6, by six connecting members 10a, b, c, d, e and f. Two intermediate 8b and d, are positioned closer to the upper beam 6 than the three lower beams 8a, c and e. Two of the connecting members 10b and 10c are both inclined towards each other and are connected by the intermediate beam 8b thus defining with beam 18, which is spaced inwardly of the lower beams 8a and 8c, a tapered wheel arch or recess 14 in the plane of the side frame 2. This recess accommodates the rear wheel 15 (FIG. 2) of the vehicle in which the frame is mounted. The foremost connecting member 10f is also inclined to the vertical and, together with the adjacent connecting member 10e and the intermediate beam 8d and the beam 25, defines a further arch or recess 13 which accommodates the front wheel 16 (FIG. 2) of the vehicle.

It can be seen from FIG. 2 that all the connecting members 10a to f are unbraced in that each pair of adjacent connecting members and the upper intermediate and lower beams to which they are welded defines a quadrilateral which is not braced by diagonal beams extending between opposite corners. The side frames are therefore relatively flexible to shear stresses in the vertical plane of the frame.

The two side frames 2 and 3 are connected together by an upper horizontal cross member 4, adjacent their forward ends, at the front of the vehicle load space, and a set of lower horizontal cross members 5a to g extending at right angles to the planes of the side frames 2, 3. Two longitudinally extending tie bars 7a, 7b interconnect the foremost pair of cross members 5g, 5f, the latter cross member being connected to its other adjacent cross member 5e by a further longitudinally extending tie bar 7c offset from the longitudinal centre line of the frame assembly. Three further tie bars 7d, e and f interconnect the four rear cross members 5a to d along a line parallel to the side frames but offset from the centre line of the frame assembly.

The upper cross member 4 interconnects the upper beams 6, 6' of the side frames 2, 3 and the lower cross members 5a to g interconnect the lower beams 8a, 18, 8c, 25 and 8a of the side frames at spaced intervals along the length of the side frames 2, 3. The whole of the load space between the side frames is therefore accessible from above and from the rear. In a similar manner to the vertical members 10a to f of the side frames, the set of lower horizontal cross members 5a to g are unbraced to allow tortional flexibility in the frame assembly.

Figure 3:
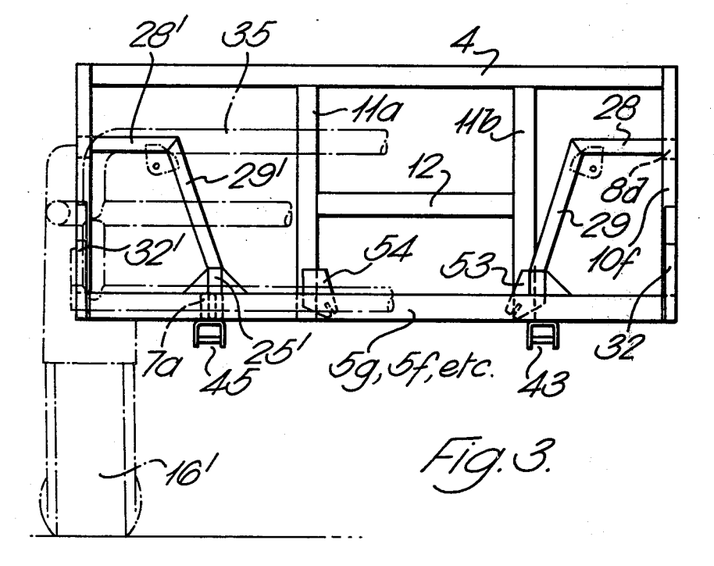
FIG. 3 is a partial front elevation of the main frame assembly of FIG. 1.
Figure 4:
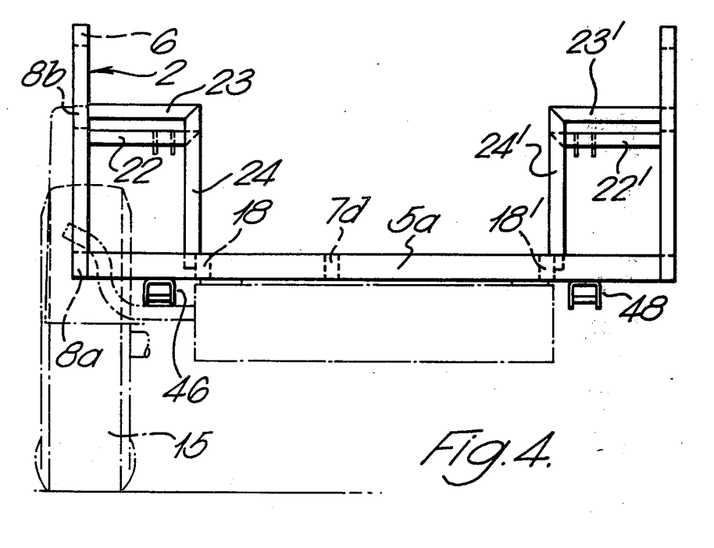
FIG. 4 is a partial rear elevation of the main frame assembly of FIG. 1.

The upper cross member 4 is positioned vertically above one of the lower cross members 5e and is connected to the lower cross member 5e by two vertical supports 11a and 11b which are themselves connected together by a horizontal tie bar 12.

Two cross members 5b and 5c are attached to the lower beams 8a and 8c immediately adjacent the mouths of the rear recesses 14 in the side frames 2, 3. In order to maintain the load carrying capacity of the side frames 2, 3 in the region of the rear recesses 14, these two cross members 5b 5c are interconnected by the two longitudinally extending lower beams or tie bars 18, 18' and are also connected to the lower beams 8a 8c of the side frame by two diagonally extending horizontal tie bars 20, 20', 21, 21'. Brackets 22, 22' for mounting the vehicle suspension extend outwardly from the connecting members 10b, 10b' and then downwardly to the tie bars 18, 18'. Additional support for the lower cross member 5a and side frames is provided by two end brackets each composed of a beam 23, 23' extending from the connecting members 10a perpendicularly to the planes of the side frames 2, 3 and a supporting beam 24, 24' extending upwardly from the cross members 5a. The construction of these brackets from a horizontal and a vertical beam retains the tortional flexibility of the frame assembly.

Similarly, two of the cross members 5e, and 5f are attached to the lower beams 8c, 8e of the side frames 2, 3 adjacent the mouth of the front recesses 13 in the side frame and are interconnected by the two longitudinally extending lower beams or tie bars 25, 25'. The two tie bars 25, 25' are mounted on top of the cross members 5e and 5f in order to provide additional clearance between the frame assembly 1 and the ground within the recesses 13. Angle brackets 19a, 19b provide additional support for the tie bars 25, 25'.

Two further diagonally extending tie bars 26, 26' connect the cross members 5e to the side frames 2, 3 rearwardly of the front recess 13. Since the part of the frame forward from the front recess 13 carries comparatively little weight, the longitudinal tie bars 7a and 7b between the cross members 5g and 5f provide adequate support for the side frames adjacent the front edge of the recesses 13, and further diagonal tie bars for the cross members 5f attached adjacent the forward corner of the mouth of the front recesses 13 are unnecessary. One diagonal bar 26' is attached to the lower beam 8c of the side frame 3 and to the cross member 5e both directly and by a further longitudinal tie bar 27' aligned with the longitudinally extending tie bar 25'. The other diagonal bar 26 is attached directly to the lower beam 8c of the side frame and to the cross member 5e by means of a further longitudinal tie bar 27 aligned with the tie bar 25. The diagonal tie bar 26 terminates short of the cross member 5e to allow sufficient space between the tie bars 25, 7c for mounting an engine asymmetrically between the front recesses 13 in the side frames 2, 3 in alignment with the three longitudinally extending tie bars 7f, d and e which interconnect the four rear horizontal cross members 5a to d.

The longitudinally extending tie bars 25, 25' are also supported by brackets composed of horizontal beams 28, 28' and projecting inwardly from the intermediate beams 8d perpendicularly to the planes of the side frames 2, 3 and a supporting beam 29, 29' extending upwardly and outwardly from the tie bars, 25, 25'.

The main frame assembly 1 is adapted at its forward end to carry a cab, part of which is indicated at 30 in FIG. 2. Support for the cab 30 is provided by a bracket 31 mounted on the front ends of the side frames 2, 3. This bracket comprises two horizontal beams 32, 32' welded to the front vertical cross members of the side frames 2, 3, a horizontal cross member 33 extending between the horizontal beams 32, 32' and two supports 34, welded to the foremost lower beam 8e of the side frames 2, 3. The bracket for the cab also carries a bumper bar 35. The rear of the cab is supported by a strip of metal 36 overlying the upper cross member 4.

The main frame assembly also carries brackets which enable the remaining parts of the vehicle to be secured to the frame. The exact numbers and locations of these brackets varies considerably depending on the size and intended purpose of the vehicle. Since the nature and positioning of these various brackets will be familiar to any person skilled in the art, only the most significant brackets will be described.

Four brackets 42, 43, 44 and 45 for the leaf springs of the vehicle suspension are mounted on the frame beneath the cross members 5e and f, additional support for these brackets being provided by the longitudinally extending tie bars 7a, 7b, 27 and 27'. Four further suspension brackets 46, 47, 48, 49 are mounted towards the rear of the vehicle on the cross members 5b and 5c adjacent the rear recesses 14 in the side frames 2, 3. In addition, each of the longitudinally extending tie bars 18, 18', 25, 25' carries a respective bracket 50 to which check straps for the suspension springs may be attached.

An engine 51 of the vehicle is mounted asymmetrically in the frame between the tie bars 25 and 7c and in alignment with the longitudinal tie bars 7d e and f, by means of two brackets 53, 54 welded onto the tie bars 25 and 7c and by a third bracket (not shown) secured to the horizontal axis member 5d. A fuel tank 55 is carried by three brackets 56 mounted, one on the tie bar 7e connecting the horizontal cross members 5c and 5b, and two on the cross member 5b.

Figures 5, 8:
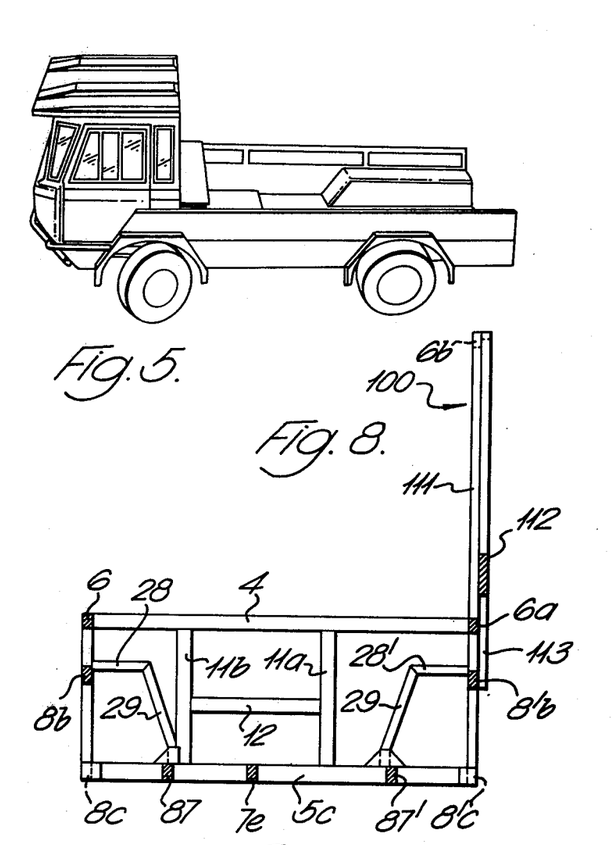
FIG. 5 is a perspective view of a vehicle incorporating the main frame assembly of FIGS. 1 to 4.
FIG. 8 is a cross section along the line A—A of FIG. 7.
Figure 6:
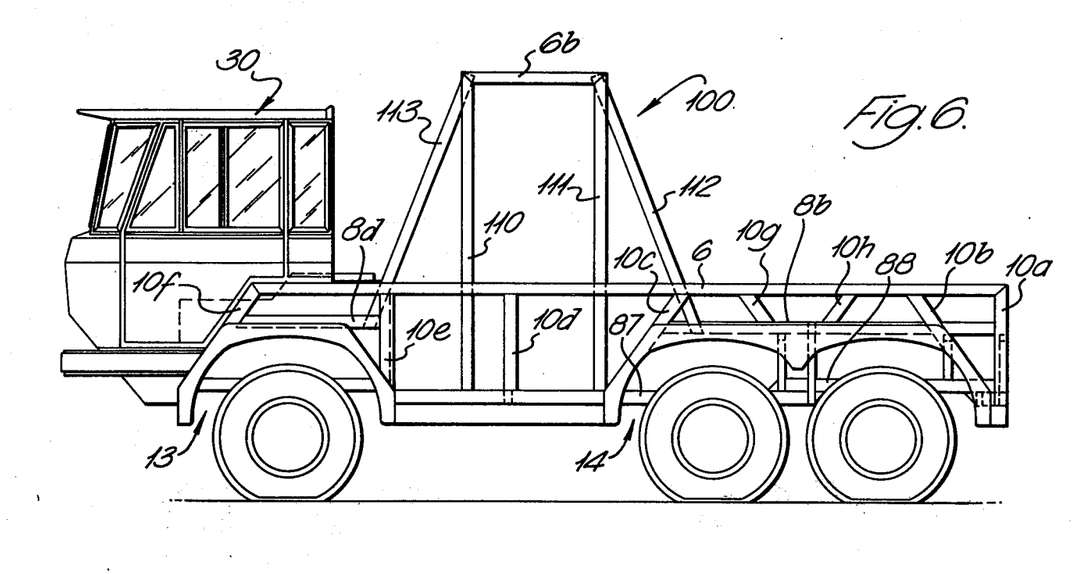
FIG. 6 is a side elevation of an alternative embodiment of the invention.

As indicated previously the main frame assembly will generally be manufactured by welding together the component beams and tie bars of the frame assembly on a jig. The brackets for supporting the remaining parts of the vehicle are then welded or bolted on to the frame assembly, and the vehicle can then be assembled. FIG. 5 illustrates the assembled vehicle.

It will be appreciated that the frame assembly and vehicle described with reference to the drawings are only examples of the invention and that the construction of the frame assembly may easily be altered to meet the desired requirements of the vehicle. Thus, the overall length of the vehicle can be increased by increasing the lengths of the upper and lower beams. If the vehicle is to include six wheels, the side frames 2, 3 may be shaped to include recesses for two further wheel arches similar to the recesses 13, 14.

The main frame assembly described is therefore not only of simple and cheap construction but can also be modified with extreme ease for use in vehicles of a wide variety of sizes.

FIGS. 6 to 9 illustrate an alternative embodiment of the invention, which is a frame assembly suitable for incorporation in a six-wheeled passenger-carrying vehicle.

Much of the frame assembly of FIGS. 6 to 9 is similar in construction to that of FIGS. 1 to 5 and similar parts have been identified by like reference numerals.

The frame assembly differs from that of FIGS. 1 to 5 in that the recesses 14, 14' defining the rear wheel arches extend sufficiently to accommodate two axles 82, 84. As in the previously described embodiment of the invention, the recesses 14, 14' are defined by the beam 8b and the inclined connecting members 10b and 10c. Two further vertical connecting members 10g, 10h join the beams 8b and 6.

Figure 7:
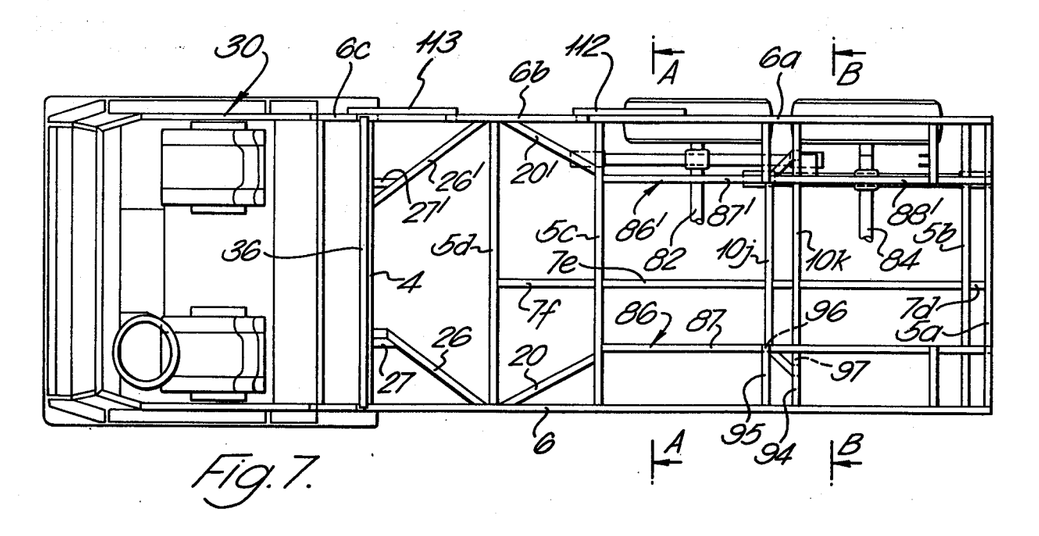
FIG. 7 is a plan view of the embodiment of FIG. 6.
Figure 9:
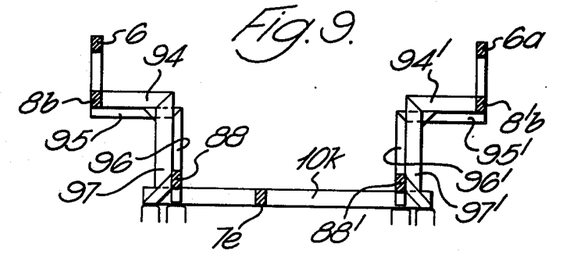
FIG. 9 is a cross section along the line B—B of FIG. 7.

As best seen in FIG. 7, two of the cross members 5b, 5c are connected to the side frames adjacent respective sides of the mouths of the recesses 14, 14'. These cross members are connected together inwardly of each recess 14, 14' by two longitudinally extending tie bars 86, 86', each of which is composed of two overlapping beams 87, 88, 87', 88'. Two further cross members 10j, 10k connect together the two tie bars 86, 86'. Further strengthening is provided by two pairs of brackets 90, 92, 90', 92' similar to the brackets 22, 22' of the embodiment of FIGS. 1 to 5, each bracket comprising a horizontal beam, 94, 95, 94', 95' connected to the beams 8b, 8b' and a vertical beam 96, 96', 97, 97', connected to the tie bars 86, 86'.

A further feature of the frame assembly of FIGS. 6 to 9 is a door frame 100 which is built into the side frame 3 of the frame assembly. The side frame 3 comprises three parallel upper beams 6a, 6b, 6c, the centre one of which 6b is positioned at a sufficient height above the other beams 6a, 6c of the side frame 3 to allow a passenger to enter the frame assembly through the side frame 3. The intermediate beam 8b is joined to the other beams 6a, 6c of the side frame 3 by two vertical connecting members 110, 111, which are additionally supported by two tie bars 112, 113.

What we claim is:

1. A main frame assembly for a road vehicle comprising two parallel spaced side frames each comprising a continuous upper beam and a plurality of interconnected lower beams, connecting members free of diagonal bracing connecting said upper beam of each side frame to said lower beams of the side frame, cross members free of diagonal bracing connecting said lower beams of one of said two side frames to said lower beams of the other of said side frames, said cross members being spaced apart along the length of said side frames, and means connecting together said upper beams adjacent their forward end only so as to define a generally U-shaped load space open at one end, and means spacing one of said lower beams of each side frame inwardly from the others to define a wheel recess.

2. A main frame assembly according to claim 1 wherein said beams, connecting members and cross members are in the form of tubes secured together by welding.

3. An assembly according to claim 2 wherein said tubes are of rectangular cross section.

4. An assembly according to claim 1 wherein said upper beam and lower beams of each side frames are parallel to each other.

5. An assembly according to claim 1 including a transverse frame connecting together said side frames adjacent their forward ends, said transverse frame being free of diagonal bracing and including an upper transverse cross member and one of said spaced cross members, and vertical supports free of diagonal bracing connecting said upper transverse cross member and said one cross member together.

6. An assembly according to claim 1 including means attaching two of said cross members connecting said lower beams of said side frames to said side frames immediately adjacent the mouth of the wheel recesses, and tie bars extending between said two cross members and between each of said cross members and said side frame.

7. A road vehicle comprising a main frame assembly, a vehicle cab, and means support said cab on one end of said main frame assembly, said main frame assembly being characterized in that it comprises two parallel spaced side frames each comprising a continuous upper beam and a plurality of interconnected lower beams, connecting members free of diagonal bracing connecting said upper beam of each side frame to said lower beams of the side frame, cross members free of diagonal bracing connecting said lower beams of one of said two side frames to said lower beams of the other of said side frames, said cross members being spaced apart along the length of said side frames, and means connecting together said upper beams adjacent their forward end only so as to define a generally U-shaped load space open at one end, and means spacing one of said lower beams of each side frame inwardly from the others to define a wheel recess.

* * * * *